(12) United States Patent
Antony

(10) Patent No.: US 10,009,371 B2
(45) Date of Patent: Jun. 26, 2018

(54) METHOD AND SYSTEM FOR MANAGING NETWORK STORM

(71) Applicant: Nicira, Inc., Palo Alto, CA (US)

(72) Inventor: Jinto Antony, Bangalore (IN)

(73) Assignee: NICIRA INC., Palo Alto, CA (US)

( * ) Notice: Subject to any disclaimer, the term of this patent is extended or adjusted under 35 U.S.C. 154(b) by 441 days.

(21) Appl. No.: 13/962,966

(22) Filed: Aug. 9, 2013

(65) Prior Publication Data

US 2015/0043334 A1 Feb. 12, 2015

(51) Int. Cl.
- *H04L 29/06* (2006.01)
- *H04W 28/02* (2009.01)
- *H04L 12/803* (2013.01)
- *G06F 21/55* (2013.01)

(52) U.S. Cl.
CPC ........ *H04L 63/1458* (2013.01); *G06F 21/554* (2013.01); *H04L 47/122* (2013.01); *H04W 28/0289* (2013.01)

(58) Field of Classification Search
CPC .......... H04W 28/0289; H04W 28/0242; G06F 9/45533; G06F 21/00; G06F 21/554; H04L 29/06
See application file for complete search history.

(56) References Cited

U.S. PATENT DOCUMENTS

| | | | |
|---|---|---|---|
| 7,801,128 B2 | 9/2010 | Hoole et al. | |
| 8,127,291 B2 | 2/2012 | Pike et al. | |
| 8,352,941 B1 | 1/2013 | Protopopov et al. | |
| 8,365,294 B2 | 1/2013 | Ross | |
| 2005/0050377 A1 | 3/2005 | Chan et al. | |
| 2005/0071840 A1 | 3/2005 | Neiger et al. | |
| 2005/0283640 A1* | 12/2005 | Cheston ................. G06F 21/57 714/38.13 |
| 2007/0192862 A1 | 8/2007 | Vermeulen et al. | |
| 2007/0250929 A1 | 10/2007 | Herington et al. | |
| 2007/0266433 A1 | 11/2007 | Moore | |
| 2008/0189769 A1 | 8/2008 | Casado et al. | |
| 2008/0196100 A1 | 8/2008 | Madhavan et al. | |
| 2008/0222717 A1 | 9/2008 | Rothstein et al. | |

(Continued)

FOREIGN PATENT DOCUMENTS

GB 2479619 10/2011

OTHER PUBLICATIONS

"Chapter 23: Configuring Port-Based Traffic Control", Catalyst 2960 and 2960-S Switch Software Configuration Guide, Aug. 2010, pp. 23-1-23-20, Cisco IOS Release 12.2(55)SE, Cisco Systems, Inc.

(Continued)

*Primary Examiner* — Walter Divito
*Assistant Examiner* — Anthony Luo
(74) *Attorney, Agent, or Firm* — SU IP Consulting

(57) ABSTRACT

A method is provided for managing a network storm associated with a physical port of a physical switch. The method, performed by a management application, includes receiving a notification of the network storm associated with the physical port, identifying a virtual switch supported by a server host that is coupled to the physical port, identifying a virtual machine coupled to the virtual switch that causes the network storm, and isolating the identified virtual machine while the physical port remains enabled.

14 Claims, 5 Drawing Sheets

(56) References Cited

U.S. PATENT DOCUMENTS

| | | |
|---|---|---|
| 2008/0244569 A1 | 10/2008 | Challener et al. |
| 2008/0289028 A1 | 11/2008 | Jansen et al. |
| 2009/0006603 A1 | 1/2009 | Duponchel et al. |
| 2009/0113031 A1 | 4/2009 | Ruan et al. |
| 2009/0122710 A1 | 5/2009 | Bar-Tor et al. |
| 2009/0249473 A1 | 10/2009 | Cohn |
| 2009/0274153 A1* | 11/2009 | Kuo ................. H04L 45/74 370/392 |
| 2010/0138830 A1 | 6/2010 | Astete et al. |
| 2010/0235831 A1 | 9/2010 | Dittmer |
| 2011/0072486 A1 | 3/2011 | Hadar et al. |
| 2011/0078497 A1 | 3/2011 | Lyne et al. |
| 2011/0107331 A1 | 5/2011 | Evans et al. |
| 2011/0107406 A1 | 5/2011 | Frost et al. |
| 2011/0119748 A1 | 5/2011 | Edwards et al. |
| 2011/0191341 A1* | 8/2011 | Meyer ................. G06F 21/50 707/736 |
| 2011/0258701 A1 | 10/2011 | Cruz et al. |
| 2012/0072581 A1* | 3/2012 | Tung ................. G06F 9/5072 709/224 |
| 2012/0278802 A1* | 11/2012 | Nilakantan ......... G06F 9/45558 718/1 |
| 2012/0300615 A1* | 11/2012 | Kempf ................. H04W 24/02 370/216 |
| 2012/0311344 A1* | 12/2012 | Sabin ................. G06F 9/45558 713/189 |
| 2013/0074181 A1 | 3/2013 | Singh |
| 2013/0166745 A1* | 6/2013 | Dinger ................. H04L 41/069 709/224 |
| 2013/0347131 A1 | 12/2013 | Mooring et al. |
| 2014/0245423 A1* | 8/2014 | Lee ................. H04L 63/0263 726/12 |
| 2014/0282502 A1* | 9/2014 | Natu ................. G06F 9/45533 718/1 |

OTHER PUBLICATIONS

"Software-defined Networking", Wikipedia, <retrieved on Apr. 17, 2013>, Retrieved from the Internet at <URL: http://en.wikipedia.org/wiki/Software_Defined_Networking>, Last modified on Apr. 16, 2013.

Garfinkel, Tal, et al., "A Virtual Machine Introspection Based Architecture for Intrusion Detection," In Proc. Network and Distributed Systems Security Symposium, Feb. 2003, 16 pages.

* cited by examiner

METHOD AND SYSTEM FOR MANAGING NETWORK STORM

BACKGROUND

Unless otherwise indicated herein, the approaches described in this section are not prior art to the claims in this application and are not admitted to be prior art by inclusion in this section.

Various approaches have been proposed to prevent traffic on a local area network (LAN) from being disrupted by a network storm, such as a broadcast, multicast, or unicast storm, on one of the physical interfaces. Such a network storm occurs when packets flood the network, creating excessive traffic and degrading network performance. FIG. 1 illustrates a block diagram of a system 100 configured to manage a network storm. In this system, host servers 130, 132, 134, and 136 are configured to couple to physical ports 104, 106, 108, and 110 of a physical switch 102, respectively. In the event a virtual machine 122, supported by the server host 134, is found to cause a network storm, one conventional approach is to disable the physical port 108 of the physical switch 102, resulting in the disabling of not only the virtual machine 122 but also all other virtual machines supported by the host server 134, such as a virtual machine 120. As has been demonstrated, an improved approach to manage network storms without disabling virtual machines unnecessarily is desired.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are therefore not to be considered limiting of its scope, the disclosure will be described with additional specificity and detail through use of the accompanying drawings.

In the drawings.

DETAILED DESCRIPTION

Figure 1:
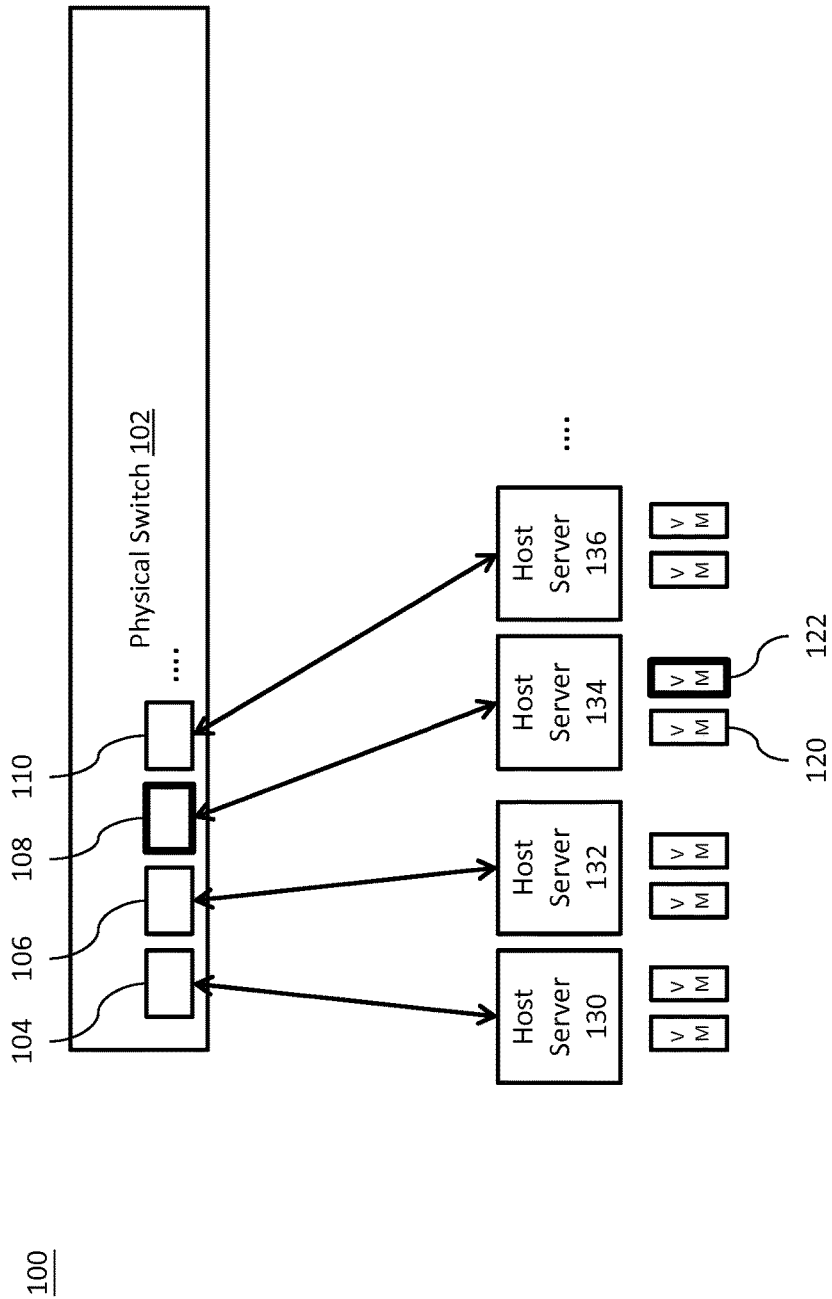
FIG. 1 illustrates a block diagram of a system configured to manage a network storm.
Figure 2:
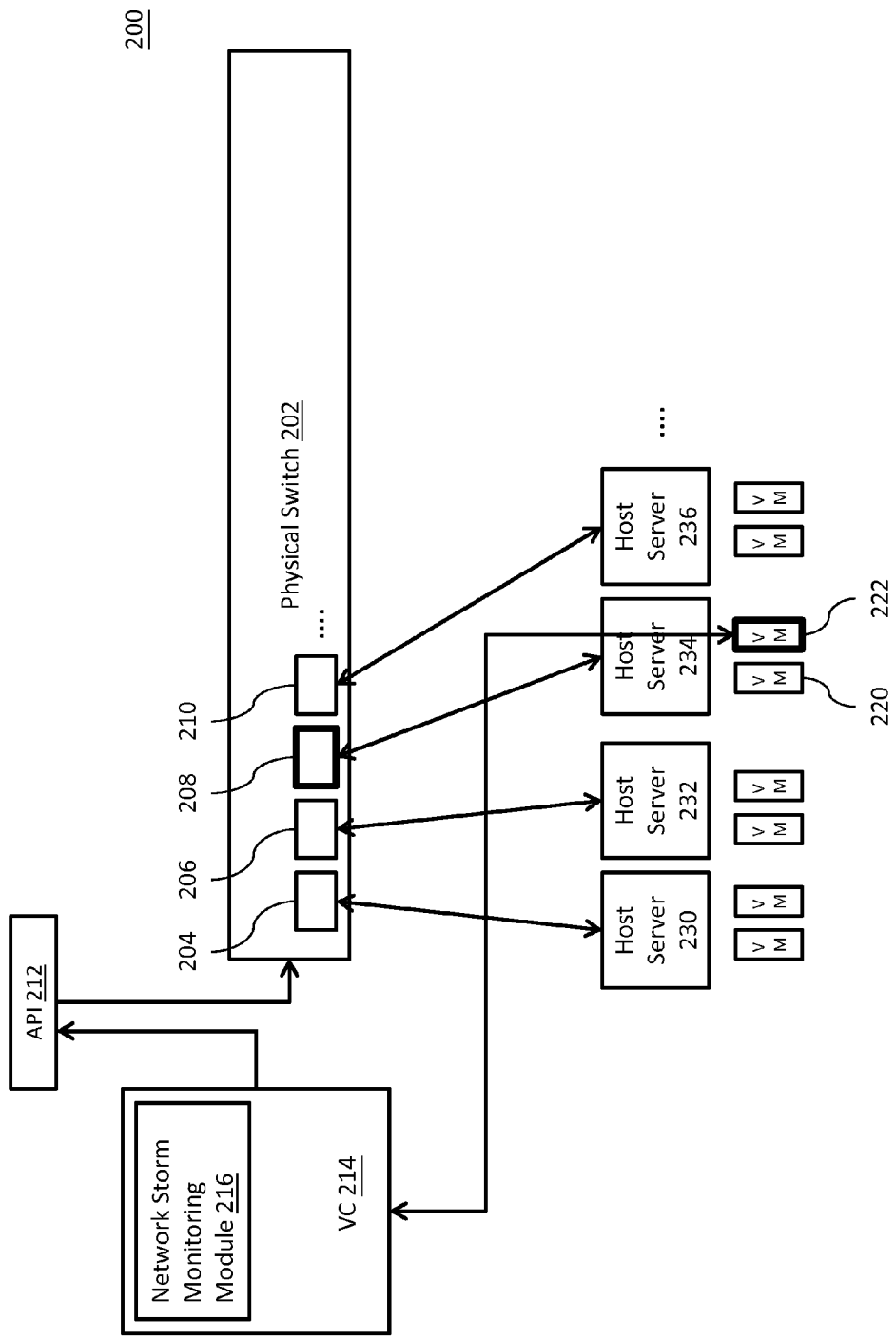
FIG. 2 illustrates a block diagram of a system configured to manage a network storm, in accordance with at least some embodiments of the present disclosure.

FIG. 2 illustrates a block diagram of a system 200 configured to manage a network storm, in accordance with at least some embodiments of the present disclosure. The system 200 may include a physical switch 202 having physical ports 204, 206, 208, and 210. The system 200 may also include one or more host servers, such as host servers 230, 232, 234, and 236, where the host servers 230, 232, 234, and 236 may be coupled to the physical ports 204, 206, 208, and 210, respectively. In one embodiment, any of the host servers 230, 232, 234, and 236 may be a server machine that includes a storage stack with at least a virtual machine file system running on it (e.g., a VMware ESX server). A management application (such as a virtual center (VC) 214) may correspond to an application that executes on any of the host servers of the system 200 and may be configured to manage infrastructure, such as virtual machines (VMs) 220 and 222 and host servers 230, 232, 234, and 236. In one embodiment the VC 214 may run on a host server such as the host server 234. In one embodiment, the VC 214 may communicate with the physical switch 202 via an Application Programming Interface (API) 212, so that the physical switch 202 may inform the VC 214 when it detects a network storm on any of its physical ports, such as the physical port 208. The VC 214 may include a network storm monitoring module 216, which may be configured to identify and isolate a virtual machine supported by a host server, such as the VM 222, that may contribute to this detected network storm. One isolation approach may involve placing a firewall around this virtual machine. Another isolation approach may involve disconnecting the virtual machine from network.

Figure 3:
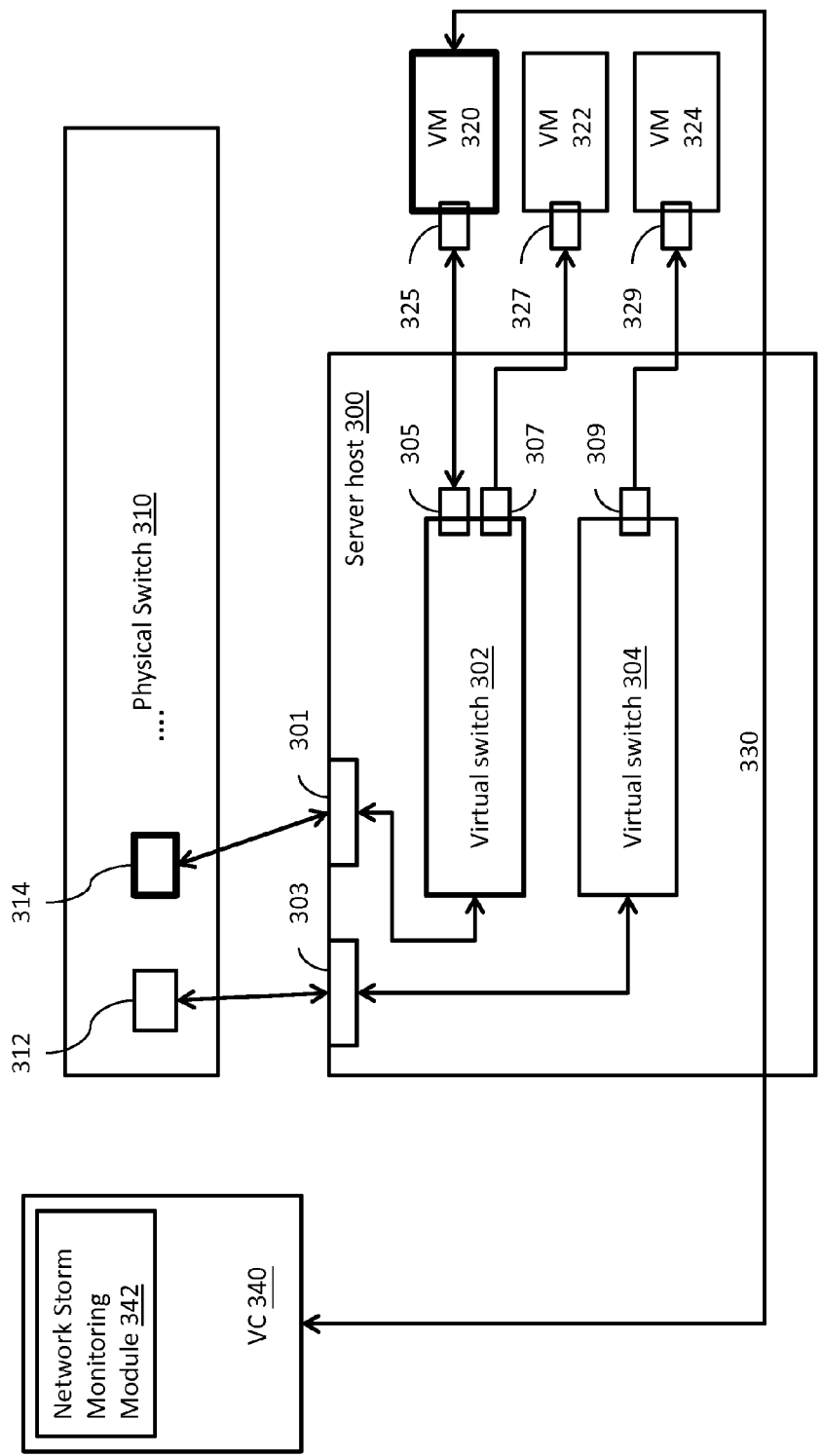
FIG. 3 illustrates a block diagram of a server host configured to interact with virtual machines, a physical switch, and a virtual center, in accordance with at least some embodiments of the present disclosure.

FIG. 3 illustrates a block diagram of a server host configured to interact with virtual machines, a physical switch, and a virtual center, in accordance with at least some embodiments of the present disclosure. In particular, a server host 300, a physical switch 310, a VC 340, and a network storm monitoring module 342 of FIG. 3 may correspond to the server host 234, the physical switch 202, the VC 214, and the network storm monitoring module 216 of FIG. 2, respectively. In addition, the server host 300 may include one or more physical network adapters, such as a physical network adapter 301 and a physical network adapter 303. The physical network adapter 301 and the physical network adapter 303 may be coupled to physical ports 314 and 312 of the physical switch 310, respectively. The server host 300 may be configured to support virtual switches having virtual ports (e.g., a virtual switch 302 having virtual ports 305 and 307 and a virtual switch 304 having a virtual port 309) and virtual machines having virtual network adapters (e.g., a VM 320 having a virtual network adapter 325, a VM 322 having a virtual network adapter 327, and a VM 324 having a virtual network adapter 329). It should be noted that each virtual machine may be configured to support more than one virtual network adapter. Each virtual machine may also be configured to communicate with the VC 340 via paths that bypass the virtual network adapters, the virtual ports, and the virtual switches, such as the illustrated path 330 between the VM 320 and the VC 340.

Figure 4:
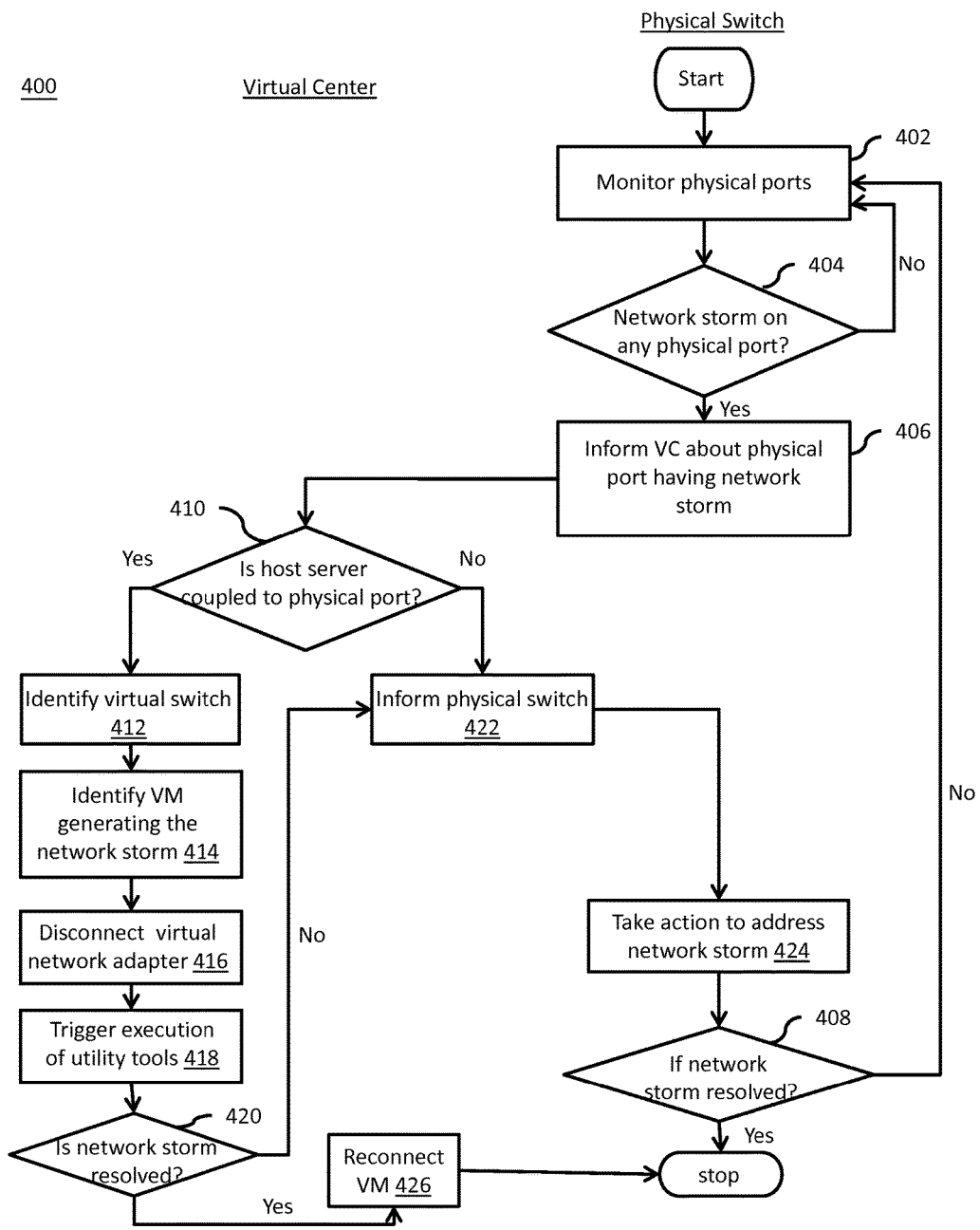
FIG. 4 is a flowchart illustrating an example method for managing a network storm, in accordance with at least some embodiments of the present disclosure.

In conjunction with FIG. 3, FIG. 4 is a flowchart illustrating an example method 400 for managing a network storm, in accordance with at least some embodiments of the present disclosure. Method 400 may include one or more operations, functions, or actions illustrated by one or more blocks, such as blocks 402, 404, 406, 408, 410, 412, 414, 416, 418, and 420. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation. The flowchart shows example operations performed by a virtual center, such as the VC 340, and a physical switch, such as the physical switch 310 in separate lanes.

In block 402, which starts operations of the physical switch 310, the physical switch 310 may be configured to monitor its physical ports. Block 402 may be followed by block 404.

In block 404, if the physical switch 310 detects network storm in any of its physical ports, such as the physical port 314, then the physical switch 310 may inform the VC 340 in block 406. Otherwise, the physical switch 310 may continue to monitor its physical ports. Block 406 may be followed by block 410.

In block 410, the network storm monitoring module 342 of the VC 340 may be configured to check whether any host server is coupled to the physical port that is experiencing the network storm (e.g., the physical port 314). If a host server is indeed coupled to the physical port 314 (e.g., the host server 300), then the VC 340 may proceed to identify virtual switches supported by the host server (e.g., the virtual switches 302 and 304) in block 412. Otherwise, the VC 340 may inform the physical switch 310 in block 422 that the VC 340 does not manage any virtual machines supported by the host servers that could contribute to the network storm. Block 422 may be followed by block 424.

In block 424, after the physical switch 310 recognizes that the network storm may come from a host, which is not managed by the VC 340, the physical switch 310 may be configured to take other actions to address the network storm. For example, the physical switch 310 may disable the physical port 314.

In block 414, the network monitoring module 342 may be configured to identify the virtual machine coupled to any of the virtual switches 302 and 304 that generates the network storm. In one embodiment, the network monitoring module 342 may be configured to monitor the network traffic between the virtual ports of the virtual switches (e.g., the virtual ports 305, 307, and 309) and the virtual network adapters of the virtual machines (e.g., the virtual network adapters 325, 327, and 329). When the network traffic exceeds a certain threshold value (e.g., number of packets transmitted within a certain period of time), a network storm may be deemed to have occurred. In some embodiments, the physical switch 310 may provide the threshold value to the VC 340. If the network monitoring module 342 determines that the network traffic between the virtual port 305 and the virtual network adapter 325 exceeds the threshold value, then the network monitoring module 342 may designate that VM 320 having the virtual network adapter 325 is the virtual machine generating the network storm. Block 414 may be followed by block 416.

In block 416, the network monitoring module 342 may be configured to disconnect a virtual network adapter from a virtual switch, such as disconnecting the virtual network adapter 325 from the virtual switch 302. Block 416 may be followed by block 418.

In block 418, after having disconnected the virtual network adapter 325, the network monitoring module 342 may trigger the execution of utility tools of the VM 320 (e.g., VMware Tools), which may include initiating a scan and/or combating malware. In some embodiments, the utility tools may be configured to communicate the result of scanning and/or combating the malware to the VC 340 in the path 330 that bypasses the virtual network adapter 325, the virtual port 305, and the virtual switch 302. For example, the utility tools may communicate the result to the VC 340 using the Virtual Machine Communication Interface (VMCI). Block 418 may be followed by block 420. In block 420, if the result indicates that the network storm associated with the VM 320 has been successfully resolved, then the VC 340 may then be configured to reconnect the VM 320 to the virtual switch 302 by reconfiguring the virtual network adapter 325 and the virtual port 305 in block 426.

On the other hand, if the result in block 420 indicates that the network storm has not been resolved, then the VC 340 may inform the physical switch 310 in block 422 that the VM 320 contributing to the network storm is disconnected. Block 422 may be followed by block 424, wherein, as discussed above, the physical switch 310 may be configured to take actions to address the unresolved network storm. Block 424 may be followed by 408, wherein the physical switch 310 may be configured to check if the network storm is resolved. If the network storm still has not been resolved, then the process of searching for the virtual machine that generates the network storm may start again from block 402.

Figure 5:
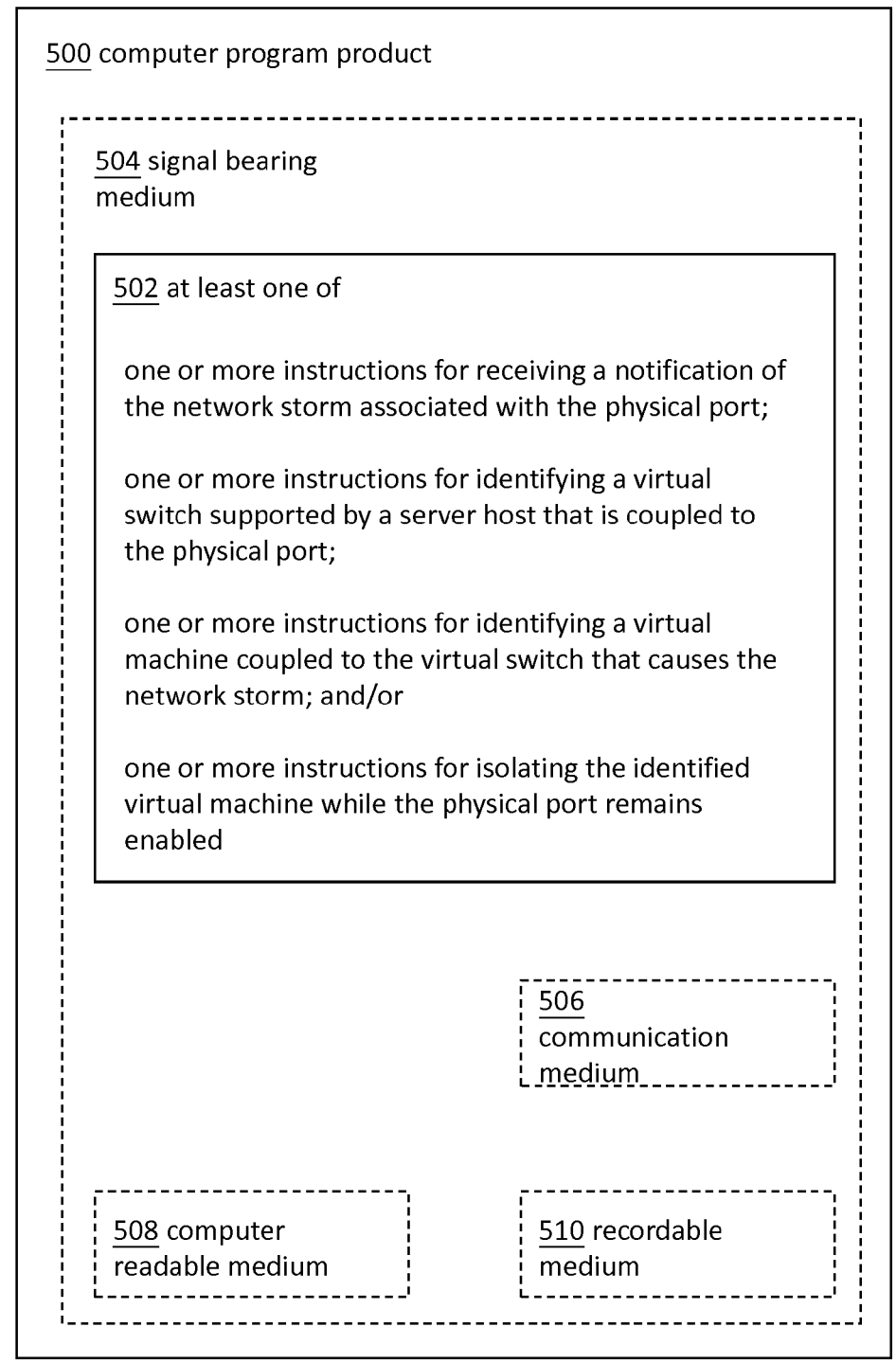
FIG. 5 is a block diagram illustrating a computer program product to implement a method to manage a network storm in accordance with at least some embodiments of the present disclosure.

FIG. 5 is a block diagram illustrating a computer program product 500 to implement a method to manage a network storm in accordance with at least some embodiments of the present disclosure. The computer program product 500 may include one or more sets of executable instructions 502 that, when executed by, for example, a host server, may provide at least the functionality described above with respect to the preceding figures.

In some embodiments, the computer program product 500 may include a signal bearing medium 504 or another similar communication medium 506. Computer program product 500 may also include a non-transitory computer readable medium 508 or another similar recordable medium 510. Some examples of the computer readable medium 508 may include a solid-state drive, a hard disk drive, a Compact Disc (CD), a Digital Video Disk (DVD), a digital tape, memory, and others. Some examples of the recordable medium 510 may include a solid-state drive, a hard disk drive, a Compact Disc (CD), a Digital Video Disk (DVD), a digital tape, memory, and others.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method for managing a network storm associated with a physical port of a physical switch, the method comprising:
receiving a notification of the network storm associated with the physical port;
identifying a server host with a physical network adapter that is coupled to the physical port;
identifying a software-implemented virtual switch that is supported by the server host and communicates with the physical switch via the physical network adapter, wherein the virtual switch includes a first virtual port and a second virtual port;
identifying a virtual machine causing the network storm, wherein the identified virtual machine includes a virtual network adapter coupled to the first virtual port of the virtual switch; and
in response to identifying the virtual machine causing the network storm, isolating the identified virtual machine by placing a firewall around the identified virtual machine or by disconnecting the identified virtual machine from the first virtual port of the virtual switch, while the physical port of the physical switch coupled to the physical network adapter of the server host remains enabled, and the second virtual port of the virtual switch also remains enabled.

2. The method of claim 1, wherein the identifying of the virtual machine comprises determining network traffic between the virtual network adapter and the identified virtual switch that exceeds a threshold value.

3. The method of claim 1, wherein the disconnecting of the identified virtual machine comprises disconnecting the virtual network adapter from the first virtual port of the identified virtual switch.

4. The method of claim 3, further comprising triggering a scan of malware in the identified virtual machine.

5. The method of claim 4, further comprising reconnecting the identified virtual machine to the identified virtual switch after having addressed the network storm.

6. The method of claim 1, wherein the receiving a notification of the network storm is via an Application Programming Interface (API) supported by the physical switch.

7. A system configured to manage a network storm, the system comprising:
   a physical switch having a first physical port and a second physical port;
   a first host server having a first physical network adapter coupled to the first physical port and a second physical network adapter coupled to the second physical port, wherein
      the first host server is configured to support a first software-implemented virtual switch with a first virtual port and a second virtual port and a second software-implemented virtual switch, and the first virtual switch and second virtual switch communicate with the physical switch via the first physical network adapter and the second physical network adapter, respectively;
   a second host server executing a management application, wherein the management application is configured to:
      receive a notification of the network storm associated with the first physical port,
      identify the first server host that is coupled to the first physical port,
      identify a virtual machine causing the network storm, wherein the identified virtual machine is coupled to the first virtual port of the first virtual switch, and
      in response to identifying the virtual machine causing the network storm, isolate the identified virtual machine by placing a firewall around the identified virtual machine or by disconnecting the identified virtual machine from the first virtual port of the virtual switch, while the first physical port of the physical switch remains enabled, and the second virtual port of the first virtual switch also remains enabled.

8. The system of claim 7, wherein the management application is configured to identify the virtual machine by determining network traffic between a virtual network adapter of the virtual machine and the first virtual switch that exceeds a threshold value.

9. The system of claim 7, wherein the management application is configured to disconnect a virtual network adapter of the identified virtual machine from the first virtual port of the first virtual switch.

10. The system of claim 9, wherein the management application is further configured to trigger a scan of malware in the identified virtual machine.

11. The system of claim 10, wherein the management application is further configured to reconnect the identified virtual machine to the first virtual switch.

12. The system of claim 7, wherein the management application is configured to receive the notification of the network storm via an Application Programming Interface (API) supported by the physical switch.

13. A non-transitory computer-readable medium having executable instructions that, in response to execution by a processor, cause the process to perform a method to manage a network storm associated with a physical port of a physical switch, the method comprising:
   receiving a notification of the network storm associated with the physical port;
   identifying a server host with a physical network adapter that is coupled to the physical port;
   identifying a software-implemented virtual switch that is supported by the server host and communicates with the physical switch via the physical network adapter, wherein the virtual switch includes a first virtual port and a second virtual port;
   identifying a virtual machine causing the network storm, wherein the identified virtual machine is coupled to the first virtual port of the virtual switch; and
   in response to identifying the virtual machine causing the network storm, isolating the identified virtual machine by placing a firewall around the identified virtual machine or by disconnecting the identified virtual machine from the first virtual port of the virtual switch, while the physical port of the physical switch coupled to the physical network adapter of the server host remains enabled, and the second virtual port of the virtual switch also remains enabled.

14. The non-transitory computer-readable medium of claim 13, wherein the identifying of the virtual machine comprises determining network traffic between a virtual network adapter of the virtual machine and the identified virtual switch that exceeds a threshold value.

* * * * *